(12) United States Patent
Arefjord et al.

(10) Patent No.: US 10,697,284 B2
(45) Date of Patent: Jun. 30, 2020

(54) OIL, WATER, GAS AND SOLID PARTICLE SEPARATION IN OIL AND/OR GAS PRODUCTION

(71) Applicant: Fourphase AS, Bergen (NO)

(72) Inventors: Anders Arefjord, Hagavik (NO); Jorgen Bruntveit, Bergen (NO)

(73) Assignee: Fourphase AS, Bergen (NO)

( * ) Notice: Subject to any disclaimer, the term of this patent is extended or adjusted under 35 U.S.C. 154(b) by 0 days.

(21) Appl. No.: 16/072,537

(22) PCT Filed: Jan. 27, 2017

(86) PCT No.: PCT/EP2017/051862
§ 371 (c)(1),
(2) Date: Jul. 25, 2018

(87) PCT Pub. No.: WO2017/137272
PCT Pub. Date: Aug. 17, 2017

(65) Prior Publication Data
US 2019/0063203 A1     Feb. 28, 2019

(30) Foreign Application Priority Data

Feb. 8, 2016   (GB) .................................. 1602204.8

(51) Int. Cl.
*E21B 43/34*     (2006.01)
*B01D 17/02*     (2006.01)
(Continued)

(52) U.S. Cl.
CPC .............. *E21B 43/34* (2013.01); *B01D 17/00* (2013.01); *B01D 17/0205* (2013.01); *B01D 17/0211* (2013.01); *B01D 17/0214* (2013.01); *B01D 17/0217* (2013.01); *B01D 17/045* (2013.01); *B01D 17/12* (2013.01);
(Continued)

(58) Field of Classification Search
None
See application file for complete search history.

(56) References Cited

U.S. PATENT DOCUMENTS

| 3,727,382 A | 4/1973 | Jackson |
| 5,980,737 A | 11/1999 | Rajewski |
| 6,214,220 B1 | 4/2001 | Favret, Jr. |

FOREIGN PATENT DOCUMENTS

| CA | 2364831 A1 | 11/2003 |
| CN | 202277704 | 6/2012 |

(Continued)

OTHER PUBLICATIONS

International Search Report and Written Opinion in related PCT application, PCT/EP2017/051862, dated Apr. 3, 2017.
(Continued)

*Primary Examiner* — Richard C Gurtowski
(74) *Attorney, Agent, or Firm* — Polsinelli, PC

(57) ABSTRACT

An apparatus for, and a method of, separating oil, water, gas and solid particles (usually sand) from a hydrocarbon-containing fluid produced from an oil and/or gas production facility. In particular, this invention relates to an apparatus and method for the separation of oil, water, gas and solid particles from a well or group of wells using an integrated apparatus which significantly reduces the space required on the production platform or rig and recycles produced gas to improve process efficiency while reducing cost.

24 Claims, 2 Drawing Sheets

(51) Int. Cl.
*B01D 19/00* (2006.01)
*B01D 17/12* (2006.01)
*B01D 17/04* (2006.01)
*B01D 17/00* (2006.01)
*B01D 21/00* (2006.01)
*B01D 21/24* (2006.01)
*B01D 21/26* (2006.01)
*B01D 21/30* (2006.01)
*B01D 21/34* (2006.01)
*B01D 46/00* (2006.01)

(52) U.S. Cl.
CPC ..... *B01D 19/0057* (2013.01); *B01D 21/0096* (2013.01); *B01D 21/2472* (2013.01); *B01D 21/267* (2013.01); *B01D 21/302* (2013.01); *B01D 21/34* (2013.01); *B01D 46/0031* (2013.01)

(56) References Cited

FOREIGN PATENT DOCUMENTS

| GB | 2242373 A | 2/1991 |
| WO | 1995/07325 A1 | 3/1995 |
| WO | 1999/38617 A1 | 8/1999 |
| WO | 2007105086 A1 | 9/2007 |

OTHER PUBLICATIONS

Combined Search and Examination Report issued by Intellectual Property Office, Great Britain, dated Sep. 6, 2016.
Extended European Search Report in corresponding European application 20150569.0 dated Apr. 17, 2020.

OIL, WATER, GAS AND SOLID PARTICLE SEPARATION IN OIL AND/OR GAS PRODUCTION

FIELD OF THE INVENTION

The present invention relates to an apparatus for, and a method of, separating oil, water, gas and solid particles (usually sand) from a hydrocarbon-containing fluid produced from an oil and/or gas production facility. In particular, this invention relates to an apparatus and method for the separation of oil, water, gas and solid particles from a well or group of wells using an integrated apparatus which significantly reduces the space required on the production platform or rig and recycles produced gas to improve process efficiency while reducing cost.

BACKGROUND

Many offshore oil and gas fields are developed and produced using a multi-well platform. In general a template is placed on the seabed, which comprises slots and a well is drilled through each slot. It is not uncommon to have 10 to 20 wells drilled from a single template. Each well will be drilled to hit a particular reservoir target or targets. The trajectory of the wells can be very different but care is taken to make sure that the wells do not collided with each other. In some cases, these wells are drilled individual at some distance between them or other templates. There wells, often called satellite wells, have individual well heads that are connected into the production system via long flow-lines to a collection manifold which in turn is connected to the production platform or facility.

The production from these wells is often co-mingled and processed on a single production platform or facility. In the case of offshore field development, these production platforms can be floating, e.g., FPSO (Floating Production Storage and Offloading) or permanent platform structures. Such productions units are very expensive systems and platform space comes at a premium. As an illustration, costs can be $100,000 per tonne of payload and $25,000 per square meter of facility area. As a result, reducing the weight and size of the required process equipment is very important. In addition, consumables required for the process require storage space, which adds to their purchase price and so increases the overall cost of their use. Again, keeping these to a minimum or ideally eliminating the need for additional products will allow for a more cost effective process requiring less platform space (and load capacity).

Generally the production from a well or group of wells will comprise oil, gas, water and solid particles (usually sand). In the industry these are often referred to as different phases, that is, there are four phases in the production flow. Before oil and/or gas can be exported from a production facility to a refinery or storage facility, it must be first cleaned of any solids and water. It is also beneficial to separate the gas from the oil so that there are two independent product streams, that is, gas and oil. Water and solid particles are considered to be by-products that need to be disposed of. Usually the solids need to be cleaned of any traces of oil so that they can be disposed of without damage to the environment. Therefore the production flow is best separated into its four phases. Today this often requires a lot of equipment to carry out these separations in sequential steps. In particular, solids are removed first using one processing step followed by water removal and finally gas and oil. As a result, a large footprint or platform area is required which increases the overall cost of the system. This can significantly increase the construction cost of the production facility or platform.

The present inventors have worked to establish technical solutions to the above restrictions associated with technology presently used in the industry or disclosed in the prior art.

SUMMARY OF THE INVENTION

In one aspect, the present invention provides an apparatus for separating oil, water, gas and solid particles from a hydrocarbon-containing fluid produced from an oil and/or gas production facility, the apparatus comprising a separation tank, the separation tank comprising:

an inlet for a multiphase hydrocarbon-containing fluid comprising oil, water, gas and solid particles to be separated into its constituent oil, water, gas and solid phases, the inlet being at an upstream side of the separation tank;

a solids separator in fluid communication with the inlet;

a solids outlet connected to the separation tank such that solids separated by the solids separator from the multiphase hydrocarbon-containing fluid can be removed from the separation tank through said solids outlet;

a first reservoir for containing an oil/water liquid mixture, from the multiphase hydrocarbon-containing fluid, which has been separated from the solids separated by the solids separator; an upper part of the separation tank being located above the first reservoir for receiving gas separated from the oil/water liquid mixture;

a second reservoir for containing oil separated from the oil/water liquid mixture, the second reservoir being located downstream of the first reservoir;

a weir at an end of the first reservoir that divides the first reservoir from the second reservoir, the weir being provided to separate oil from the oil/water liquid mixture;

a first liquid outlet of the first reservoir connected to a lower part of the separation tank;

a second liquid outlet of the second reservoir connected to the lower part of the separation tank; and a gas outlet connected to the upper part of the separation tank.

Optionally, the solids separator is a hydrocyclone. Typically, a solid particles collector is located beneath the solids separator such that the separated solid particles from the solids separator are collected in said solid particles collector. A weighing device may be provided for weighing the separated solid particles in said solid particles collector. A fluidisation flushing system is preferably located in the vicinity of the solid particles collector for flushing solid particles though the solids outlet. A controller for the fluidisation flushing system may be arranged to operate the fluidisation flushing system based on a solids weight detected by the weighing device.

Optionally, a first measurement device is provided for measuring a level of the water/oil liquid mixture in the first reservoir. Optionally a second measurement device is provided for measuring, directly or indirectly, a level of a water/oil interface in the water/oil liquid mixture in the first reservoir. A third measurement device may be provided for measuring, directly or indirectly, a level, depth or volume of oil in the second reservoir.

Optionally, at least one of the first liquid outlet and/or the second liquid outlet further comprises a pump located downstream thereof for controlling a liquid flow rate through the respective outlet. The gas outlet may further comprise a compressor. Optionally, at least one of the gas outlet, the first liquid outlet and/or the second liquid outlet further comprises a respective bypass conduit and associated valve. A pressure sensor may be provided for monitoring an internal gas pressure of the separation tank. A safety pressure release valve may be connected to the upper part of the separation tank, the safety pressure release valve being configured to be opened when the internal gas pressure exceeds a predefined maximum safe operating limit.

Optionally, the apparatus further comprises a coarse solid particle separator upstream of the inlet for separating coarse particles from the hydrocarbon-containing fluid.

In a preferred embodiment, a gas fluffer is positioned along a lower portion of the first reservoir. Gas fluffers are known to those skilled in the art. Preferably, the separation tank further comprises a second inlet for gas connected to the gas fluffer, the second inlet being provided to supply gas to the gas fluffer. The preferred apparatus further comprises a first separator provided upstream of the separation tank. The first separator comprises an inflow conduit for the hydrocarbon-containing fluid, a first outlet of the first separator communicating an upper part of the first separator with the second inlet to convey gas separated from the hydrocarbon-containing fluid to the gas fluffer provided inside the separation tank, and a second outlet communicating a lower part of the first separator with the inlet of the separation tank to convey liquid and solid phases of the hydrocarbon-containing fluid to the separation tank.

Typically, the first separator further includes a liquid level sensor and a first control module coupled thereto for controlling a liquid level within the first separator to be within a predetermined range. The first separator may further include an internal gas pressure sensor and a second control module coupled thereto for controlling a gas pressure within the first separator to be within a predetermined range. A third outlet of the first separator may be located lower on the first separator than the first outlet, the third outlet communicating the upper part of the first separator with the inlet to convey gas separated from the hydrocarbon-containing fluid to the separation tank. Typically, the first outlet, the second outlet and the third outlet are each provided with a respective independently controllable valve selectively to open or close the respective outlet and control a flow rate through the respective outlet. Preferably, a controller comprises respective valve controlling modules for the respective valves.

Optionally, the apparatus further comprises a coalescer within the upper part of the separation tank and positioned above the first reservoir. The coalescer is adapted to remove oil and water droplets entrained in gas from the hydrocarbon-containing fluid the separated gas through condensation of oil and/or water onto a surface of the coalescer.

Preferably, the apparatus is adapted continuously to separate oil, water, gas and solid particles from a continuous flow of a hydrocarbon-containing fluid produced from an oil and/or gas production facility.

The present invention also provides an oil and/or gas production facility incorporating the apparatus of this first aspect of the invention.

In a second aspect, the present invention provides a method of separating oil, water, gas and solid particles from a hydrocarbon-containing fluid produced from an oil and/or gas production facility, the method comprising the steps of:
(i) passing a multiphase hydrocarbon-containing fluid comprising oil, water, gas and solid particles into a separation tank through an inlet located at an upstream side of the separation tank;
(ii) separating solid particles and fluid, from the multiphase hydrocarbon-containing fluid, in a solids separator in fluid communication with the inlet and located within the separation tank;
(iii) conveying separated solids from the separation tank through a solids outlet of the separation tank;
(iv) passing a fluid mixture containing oil, water and gas from the multiphase hydrocarbon-containing fluid into a first reservoir of the separation tank;
(v) separating gas from an oil/water mixture in the first reservoir, the separated gas being received above the first reservoir;
(vi) conveying separated gas from the first reservoir out of the separation tank through a gas outlet of the separation tank;
(vii) separating oil and water in the oil/water liquid mixture in the first reservoir to form and oil layer;
(viii) allowing separated oil in the first reservoir to flow over a weir at an end of the first reservoir into a second reservoir of the separation tank located downstream of the first reservoir;
(ix) conveying separated water from the first reservoir through a first liquid outlet of the separation tank;
(x) conveying separated oil from the second reservoir through a second liquid outlet of the separation tank.

Optionally, the solids separator is a hydrocyclone. The separated solid particles may be collected in a solid particles collector in the separation tank. An amount of separated solid particles collected in the solid particles collector may be continuously or intermittently weighed. The method may further comprise the step of flushing separated solid particles from the solid particles collector using a fluidisation flushing system. The flow of water through the fluidisation flushing system may be directed according to the weight of separated solid particles in the solid particle collection bucket.

Typically, the method further comprises the step of measuring the level of the water/oil liquid mixture in the first reservoir, and optionally the step of measuring directly or indirectly, a level of a water/oil interface in the water/oil liquid mixture in the first reservoir. The flow rate of water through the first liquid outlet step may be controlled to ensure that the level of the water/oil interface in the first reservoir is maintained below a top of the weir. The method preferably further comprises the step of measuring, directly or indirectly, a level, depth or volume of oil in the second reservoir. The flow rate of oil through the second liquid outlet is preferably controlled to ensure that the height of the oil in the second reservoir is below the weir.

Optionally, the method further comprises the step of compressing the separated gas conveyed through the gas outlet to feed into a gas production stream. The pressure of the oil conveyed through the second liquid outlet may be boosted to feed into an oil production stream.

Optionally, an internal gas pressure of the separation tank may be monitored. A safety pressure release valve may be opened to reduce the internal gas pressure of the separation tank when the internal gas pressure exceeds a predefined maximum safe operating limit.

Optionally, the method may further comprise the step of separating coarse solid particles from the hydrocarbon-containing fluid upstream of the inlet.

In a preferred embodiment, the method further comprises the steps of: passing a supply of gas through a gas fluffer at a lower portion of the first reservoir in order to form gas bubbles in the oil/water liquid mixture; and passing the gas bubbles through the oil/water liquid mixture to collect droplets of oil entrained within the water. In the preferred embodiment, preferably the method further comprises providing a first separator upstream of the separation tank. The hydrocarbon-containing fluid is passed into the first separator through an inflow conduit of the first separator. Gas is separated from the hydrocarbon-containing fluid in the first separator to form a separated gas and the remaining liquid and solid phases of the hydrocarbon-containing fluid are conveyed from an outlet of the first separator to the inlet of the separation tank. At least a first portion of the separated gas is conveyed from the first separator through a first gas outlet of the first separator to the gas fluffer located in the separation tank thereby to provide the supply of gas for the gas fluffer. Optionally, a second portion of the separated gas from the first separator is conveyed through a second gas outlet of the first separator into the inlet of the separation tank. The method may further comprise the step of controlling the flow rate of gas through the first gas outlet and the second gas outlet and controlling the flow rate of liquid phases through the outlet of the first separator in order to prevent the level of the liquid phases rising to the level of the first or second gas outlets.

Optionally, the method further comprises the step of coalescing any entrained oil or water droplets or vapour from the separated gas on a coalescer within an upper part of the separation tank and positioned above the first reservoir, the coalescer being adapted to remove oil and water droplets or vapour entrained in the gas through condensation of oil and/or water onto a surface of the coalescer.

Preferably, the method of this aspect of the present invention continuously separates oil, water, gas and solid particles from a continuous flow of a hydrocarbon-containing fluid produced from an oil and/or gas production facility.

In a third aspect of the present invention, there is provided an apparatus for separating oil, water and gas from a hydrocarbon-containing fluid produced from an oil and/or gas production facility, the apparatus comprising: a separation tank for separating a multiphase hydrocarbon-containing fluid comprising oil, water and gas into its constituent oil, water and gas phases, the separation tank including a first inlet for the hydrocarbon-containing fluid, a second inlet for gas and, connected to the second inlet, a gas fluffer for passing gas bubbles through an oil/water mixture in a reservoir of the separation tank to collect droplets of oil entrained within the water; and a first separator provided upstream of the separation tank, the first separator comprising an inflow conduit for the hydrocarbon-containing fluid, a first outlet of the first separator communicating an upper part of the first separator with the second inlet to convey gas separated from the hydrocarbon-containing fluid to the gas fluffer provided inside the separation tank, and a second outlet communicating a lower part of the first separator with the first inlet of the separation tank to convey liquid phases of the hydrocarbon-containing fluid to the separation tank.

Typically, the first separator further includes a liquid level sensor and a first control module coupled thereto for controlling the liquid level within the first separator to be within a predetermined range.

Optionally, the first separator further includes an internal gas pressure sensor and a second control module coupled thereto for controlling a gas pressure within the first separator to be within a predetermined range.

Preferably, the first separator further comprises a third outlet of the first separator, located lower on the first separator than the first outlet, communicating the upper part of the first separator with the first inlet to convey gas separated from the hydrocarbon-containing fluid to the separation tank. Typically, the first outlet, the second outlet and the third outlet are each provided with a respective independently controllable valve selectively to open or close the respective outlet and control a flow rate through the respective outlet. A controller comprising respective valve controlling modules for the respective valves may be provided.

In one embodiment, the separation tank further comprises a solids separator for separating solid particles from the multiphase hydrocarbon-containing fluid. However, alternatively the separation tank may be configured to separate only fluid phases, i.e. oil, water and gas.

Optionally, the apparatus further comprises a coarse solid particle separator upstream of the first inlet and downstream of the first separator for separating coarse particles from the multiphase hydrocarbon-containing fluid. Alternatively, a coarse solid particle separator may be located upstream of the first inflow conduit for separating coarse particles from the multiphase hydrocarbon-containing fluid.

Preferably, the apparatus of this aspect of the present invention is adapted continuously to separate oil, water, gas and solid particles from a continuous flow of a hydrocarbon-containing fluid produced from an oil and/or gas production facility. The present invention also provides an oil or gas facility incorporating the apparatus of this aspect of the present invention.

In a fourth aspect of the present invention, there is provided a method of separating oil, water and gas from a hydrocarbon-containing fluid produced from an oil and/or gas production facility, the method comprising the steps of:
(i) passing a multiphase hydrocarbon-containing fluid flow comprising oil, water and gas into a first separator through an inflow conduit of the first separator;
(ii) separating gas from the hydrocarbon-containing fluid in the first separator to form a separate gas;
(iii) conveying liquid phases of the hydrocarbon-containing fluid from an outlet of the first separator to an inlet of the separation tank, the separation tank being adapted for separating the multiphase hydrocarbon-containing fluid comprising oil, water and gas into its constituent oil, water and gas phases;
(iv) conveying at least a first portion of the separated gas from the first separator through a first gas outlet of the first separator to a gas fluffer located in the separation tank; and
(v) bubbling gas from the gas fluffer through an oil/water mixture in the separation tank to collect droplets of oil entrained within the water.

Optionally, the method further comprises the step of conveying a second portion of the separated gas from the gas separator through a second gas outlet of the first separator into the inlet of the separation tank. Typically, the further comprises the step of controlling the flow rate of gas through the first gas outlet and the second gas outlet and controlling the flow rate of liquid phases flow through the outlet of the first separator in order to prevent the level of the liquid phases rising to the level of the first or second gas outlets.

In some embodiments of this method of the present invention, the hydrocarbon-containing fluid further comprises solid particles. In one embodiment, the method further comprises the step of separating, in the separation tank, solid particles from the oil, water and gas of the hydrocarbon-containing fluid. In another embodiment, the method further comprises the step of separating coarse solid particles from the hydrocarbon-containing fluid at a location upstream of the inlet of the separation tank and downstream of the outlet of the first separator. In a further embodiment, the method further comprises the step of separating coarse solid particles from the hydrocarbon-containing fluid at a location upstream of the inflow conduit of the first separator.

Preferably, the method of this aspect of the present invention continuously separates oil, water and gas from a continuous flow of a hydrocarbon-containing fluid produced from an oil and/or gas production facility.

The preferred embodiments of the present invention accordingly provide an apparatus for separating oil, water, gas and solid particles from a hydrocarbon-containing fluid produced from an oil and gas production facility using a compact unit where all four phases are separated. The apparatus comprises an inlet tank that is connected to the main production conduit through which the produced phases (all four phases) flow into the inlet tank and an outlet conduit that is connected to a second larger separation tank, which is at a lower pressure than the inlet tank. The inlet tank will be at a pressure that is controlled by a choke in the production conduit before the inlet tank. Preferably the inlet tank has three output conduits each of which has a valve to direct or choke the flow from the tank through each conduit to the separation tank. Ideally there are two gas exits positioned at the upper part or top of the inlet tank. One is a gas exit conduit that allows flow to be directed into the base of the separation tank through a gas fluffer/flotation device. The other gas exit allows gas to be directed into a cyclone that is built into the separation tank. The third exit from the inlet is positioned close to the bottom of the tank and allows the flow of oil, water and solid particles into the separation tank.

Preferably there is a hydrocyclone built within the separation tank and oil, water, gas and solid particles flow from the inlet tank through this hydrocyclone. Below the hydrocyclone there is a solid particles collection bucket where separated solid particles are collected and weighed. Additionally, the solid particles collection bucket is equipped with a fluidisation flushing system to remove separated solid particles from the separation tank. Preferably, the flushing unit is controlled by a controller that uses measurements of the weight of solid particles collected and directs flow of water through the fluidisation head to flush the solid particles and water mixture out of the separation tank. The solid particles can then be washed by any number of processes well known or collected and shipped to dedicated solids cleaning and disposable plant.

In addition to removing solid particles from the flow, the hydrocyclone will also remove most of the gas in the production stream. Preferably this occurs at a cyclone knocker placed within the hydrocyclone that disturbs the rotational flow within the cyclone and gas is released to exit through the top of the hydrocyclone. The remaining oil/water mixture exits the hydrocyclone and enters into the main body of the separation tank. As oil is lighter than water, the oil tends to rise to the top of the liquid column in the separation tank forming a layer floating on top of the water.

Preferably there is a gas fluffer/flotation device within the separation tank positioned along its base. This device is fed with gas leaving the inlet tank through the topmost gas exit conduit and is adapted to aid the separation of oil droplets from the water. The gas leaving the fluffer/flotation device is in the form of streaming small bubbles that "collect" small droplets of oil entrained within the water column bringing them to the surface of the liquid column and therefore improve the oil/water separation in the separation tank.

Preferably there is a coalescer or a barrier of fine mesh within the separation tank that passes from the top of the tank and down into the liquid column of oil and water. This is placed between the hydrocyclone and a baffle device. The coalescer helps to remove oil that may be carried as a very fine mist within the gas at the top of the tank. This oil will coalesce on the mesh and form droplets of oil that run down it into the liquid column below. It therefore improves the oil/gas separation in the separation tank.

Preferably a baffle is placed in the separation tank at the opposite end to the fluid inlet to the tank and the hydrocyclone. Oil that is floating on top of the water will flow over the baffle to the downstream side of the baffle. Preferably there are measurement instruments that measure the level of the oil/water column, the thickness of the oil layer floating on top of the water and the level of the oil column on the downstream side of the baffle. Preferably there are fluid exit conduits from the separation tank either side of the baffle that have valves and pumps to each that allow the control of fluid flow from each exit independently. Oil pumped from the downstream side of the baffle can be boosted in pressure using the pump to be fed into the oil production stream from the platform and water can be pump for further treatment and/or disposal.

Preferably there is a gas exit conduit on the top of the separation tank that is on the opposite (downstream) side of the coalescer to the inlet conduit into the tank and to the hydrocyclone. This gas exit conduit allows gas to leave the tank and can be flared (burnt off) or compressed to feed into the gas production stream from the platform.

Preferably all measurement instruments, valves and pumps are connected to a controller. If a gas compressor is used then it too is connected to the controller. The controller is then programmed to process the measurements and control the pumps (and compressor) to ensure that the level of the oil/water column never reaches a point where water enters the downstream side of the baffle and also ensures that the oil level on the downstream side of the baffle is always below the baffle height and cannot return to the upstream side of the baffle. The controller or controllers can also be used to ensure the level in the inlet tank is within predefine limits and that the gas pressure is also controlled within defined parameters. Ideally there is a safety pressure relief valve in the separation tank that ensure the pressure never gets above some predefined maximum safe operating limit. If the pressure comes close to this save limit, the valve opens automatically and vents (or relieves) the high pressure gas within the tank to a safe area.

BRIEF DESCRIPTION OF THE DRAWINGS

Embodiments of the present invention will now be described in more detail by way of example only with reference to the accompanying drawings, in which.

DETAILED DESCRIPTION

Figure 1:
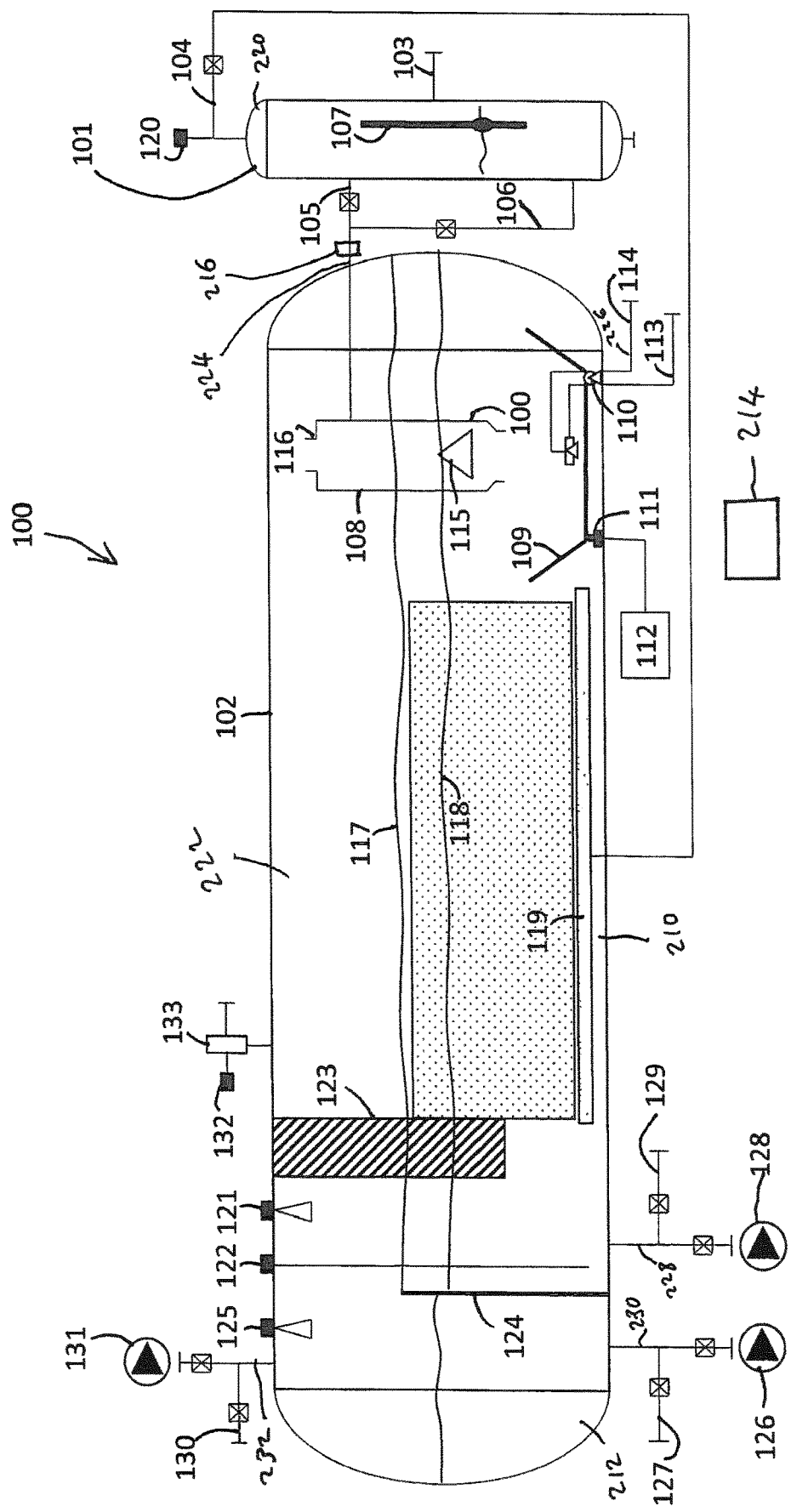
FIG. 1 schematically illustrates a side view of a solid particle, water, oil and gas separation system in accordance with an embodiment of the present invention.

Referring to FIG. 1 there is shown a schematic illustration of an oil, water, gas and solids separation system, designated generally as 100, which constitutes an apparatus for separating oil, water, gas and solid particles from a hydrocarbon-containing fluid produced from an oil and/or gas production facility in accordance with an embodiment of the present invention. The separation system 100 comprises an inlet separator tank 101 and a larger separation tank 102 downstream thereof. Oil, water, gas and solids (usually sand) enter the inlet separator tank 101 via inflow conduit 103. This inflow conduit 103 contains production flow from a production manifold, not shown, that has come from an oil well or group of oil wells. This manifold may also choke the flow so that the pressure of the mixture entering the inlet separator tank 101 is regulated.

In accordance with the first and second aspects of the present invention as identified above, the separation tank 102 is configured to separate the hydrocarbon-containing fluid, which comprises four phases, that is oil, water, gas and solid particles, into its constituent four phases. A single separation tank separates the hydrocarbon-containing fluid inti the individual four phases, each of which can provide a respective output from the separation tank.

In accordance with the third and fourth aspects of the present invention as identified above, the inlet separator tank 101 can separate gas from the hydrocarbon-containing fluid, which may comprises three phases, that is oil, water, gas, which is fed to the inlet separator tank 101. The oil and water phases are fed from the inlet separator tank 101 to the separation tank 102, downstream of the inlet separator tank 101, in which the oil and water phases are separated. The gas is fed from the inlet separator tank 101 to a gas fluffer 119 in the separation tank 102, the gas fluffer 119 being used to assist separation of the water and oil phases in the separation tank 102. This avoids the need for additional gas, such as nitrogen, to be provided to the gas fluffer. The hydrocarbon-containing fluid which is fed to the inlet separator tank 101 may only comprises three phases, namely oil, water and gas, and any solid phase, in the form of particles, may have been removed from the hydrocarbon-containing fluid by a solids separator upstream of the inlet separator tank 101. Alternatively, the hydrocarbon-containing fluid which is fed to the inlet separator tank 101 may comprise four phases, that is oil, water, gas and a solid phase, in the form of particles, and the liquid and solid phases are separated from the gas phase in the inlet separator tank 101 and then the separated liquid and solid phases are fed to the separation tank 102, downstream of the inlet separator tank 101, in which the oil, water and solid phases are separated.

As the production enters into the inlet separator tank 101, the solids and liquids tend to fill the inlet separator tank 101 increasing the level, which is measured using the fluid level sensor 107. In FIG. 1 this sensor is shown as a float type device; however, those skilled in the art will appreciate that there are many other types readily available.

Gas that enters the inlet separator tank 101 as part of the hydrocarbon-containing fluid will tend to partially separate and fill the void above the liquid level. This gas cap will act as a pressure drive, thereby forcing the oil, water and solids mix within the inlet separator tank 101 out through conduit 106 and into a hydrocyclone 108 located within the separation tank 102. Preferably this hydrocyclone 108 is a dynamic cyclone as described in GB-A-2529729; however, any other suitable hydrocyclone could be used.

The fluid/particle mixture entering hydrocyclone 108 creates a rotation flow through the hydrocyclone 108 where the heavier particles are thrown outwards by centrifugal forces towards the cyclone wall. Here they will be slowed by frictional forces at the wall and will drop out of the liquid phase into the solids bucket 109, which is within the separation tank 102.

Figure 2:
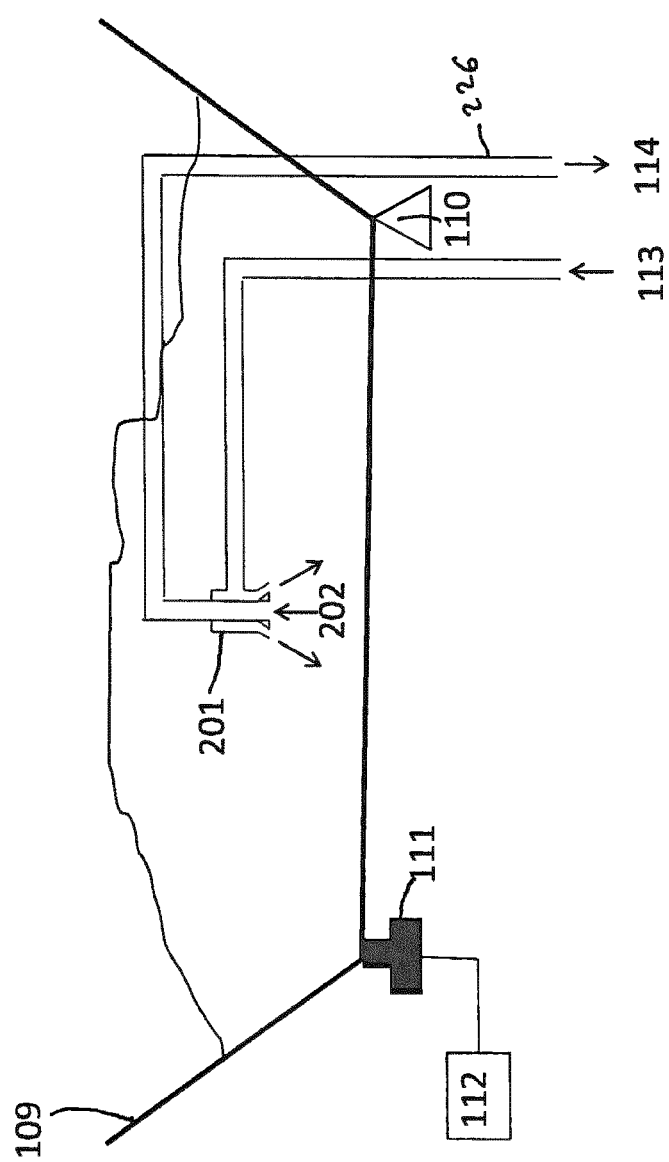
FIG. 2 schematically illustrates in enlarged detail the solids bucket and flushing unit of the separation system of FIG. 1.

The solids bucket 109 is pivoted on an axle 110, provided on one side thereof, and rests on a weight sensor 111, provided on an opposite side thereof. This configuration is more clearly shown in FIG. 2. The weight sensor is connected to a display device 112 and can also be connected to a controller, not shown.

As the amount of solids collected increases in the solids bucket 109, the weight is recorded on display device 112 and also by the controller. Once the quantity of solids reaches some predetermined amount, they are flushed from the solids bucket 109 and out of the separation tank 102 through a solids outlet 226. This is achieved using a water fluidisation and flushing unit. Water is pumped through the conduit 113 and out from the nozzles in the fluidisation head 201, whereby the water fluidises the solids in the vicinity of the head 201. The mixture of water and solids then enters into the central conduit 202 in the head 201, and exits through the conduit 114. Both conduits 113 and 114 pass through to the exterior of the separation tank 102, as shown in FIG. 1. During this operation flow of hydrocarbon fluid into the separation tank 102 may be temporarily stopped. As the solids are flushed from the separation tank 102, the weight in the solids bucket 109 decreases. Once the weight has been reduced below a predefined value, the controller switches off (or it is switched off manually) the flow of water thought conduit 113 and flushing stops. Flushing will start again once sufficiently more solids are collected, at which time another flushing cycle starts.

Returning to the description of the flow though hydrocyclone 108, the solid particles are removed as described above leaving water, oil and gas as the remaining phases.

The water and oil are collected in a first reservoir 210 in the separation tank 102 which has at a downstream end thereof with respect to the flow of oil through the separation tank 102 a baffle 124, which functions as a weir, and on the downstream side of the baffle 124 is a second reservoir 212 downstream of the first reservoir 210 which collects oil which has flowed over the top of the weir.

The gas is released from the liquids by the agitation at the cyclone knocker 115 that disturbs the rotational flow within the hydrocyclone 108, and will exit from the hydrocyclone 108 at the top exit 116. The remaining water and oil liquid mixture exits the cyclone at the bottom thereof and increases the liquid level 117 in the separation tank 102. Above this level 117 is gas and below level 117 is liquid, composed of oil and water. This fluid level 117 is measured using the ultrasonic level sensor (other types of level measurement can be used) 121 which can be connected to the controller (not shown).

In FIG. 1 it is shown that the inlet separator tank 101 has three exit conduits 104, 105 and 106 that allow flow from the inlet separator tank 101 into the inlet 224 of the main separation tank 102. Each exit conduit 104, 105 and 106 has an associated valve, as shown in FIG. 1. As described above, the water, oil and solids mixture will exit the inlet separator tank 101 through the lower exit 106 driven by the gas pressure in the top of the inlet separator tank 101. If the liquid level in the inlet separator tank 101 drops below a predefined value as measured by level sensor 107 then the controller may close the value of 106 and open 105 so that gas exits the inlet separator tank 101 directly into the hydrocyclone 108. It should be noted that this gas could be 'wet', that is it could contain droplets of oil and/or water.

In FIG. 1 there is shown a pressure sensor 120 placed in the inlet separator tank 101 that can be connected to the controller and can be used to control the production flow into inlet separator tank 101 via conduit 103. The topmost exit 104 allows gas flow from the upper part 220 of the inlet separator tank 101 to be directed through a gas fluffer 119 which functions as an oil flotation device to cause oil droplets in the oil/water mixture to be floated upwardly by the action of rising gas bubbles from the gas fluffer 119. This gas fluffer 119 comprises perforated pipes covering the bottom section of the separation tank 101. Gas injected into it permeates through the perforations to form gas bubbles which then rise through the oil/water mix. The liquid leaving the hydrocyclone 108 is a mixture of oil and water and because of their density difference the oil will rise to the top to float on top of the water. The water level is labelled 118 and the top of the oil and water column is labelled 117. A linear resistivity sensor 122 is provided to measure where the interface between water and oil exists. As the resistivity of oil is very much higher than that of produced water, the measured resistance below the oil/water interface is low and the resistance above is much higher. Thus the position of the oil/water interface can be measured continually in real-time.

Returning to the description of the gas fluffer 119, as gas bubbles exit the perforations they rise through the oil/water liquid and will serve to enhance the separation of small droplets of oil from the water carrying them to the top of the liquid in the separation tank 102. The gas itself will leave the liquid and move above the level 117 into the top of the separation tank 102. As a result, the separation tank 102 will contain gas at its upper part 222, which is located above at least the first reservoir 210 and in the illustrated embodiment extends above both the first reservoir 210 and the second reservoir 212, and a liquid column that has two levels, namely level 118 indicating the top of water and level 117 indicating the top of oil (if there is any oil present). The linear resistance sensor 122 will provide a measurement of the thickness of the oil float on top of the water.

As discussed previously, the gas entering and leaving the hydrocyclone 108 can be wet and so can contain droplets of oil and or water. These will be very small but it is desirable to recover these liquids from the gas to improve the recovery of oil and gas. In FIG. 1 there is shown a coalescer 123 that comprises a fine mesh onto which oil and/or water condenses above the level 117 and runs down into the liquid column below. The oil will float on and the water will sink below level 118. Therefore, the gas to the upstream side of the coalescer 123 (i.e. the right-hand side shown in FIG. 1) may be wet but the gas column to the downstream side of the coalescer 123 (i.e. the left-hand side shown in FIG. 1) is dry.

The final stage of the four phase separation process is provided by the baffle 124, functioning as a weir, shown in FIG. 1. As the amount of liquid in the separation tank 102 increases, oil on the top of the liquid in the first reservoir 210 will flow over the baffle 124 into the second reservoir 212 downstream of the baffle 124. Water exits the bottom of the first reservoir 210 though water outlet 228. Oil exits the bottom of the second reservoir 212 though oil outlet 230. Gas exits the upper part 222 of the separation tank 102 through gas outlet 232, which is located above the second reservoir 212 but may alternatively be located above the first reservoir 210. The level of oil in the second reservoir 212 is measured using the ultrasonic level sensor 125. This oil can be boosted by the pump 126 and directed into the main oil production line (not shown) from the production platform or it could be drained through exit conduit 127 to another storage tank, not shown. Booster pump 126 can be controlled using a control that uses the oil level as measured by sensor 125 to control the process. Also, if the water level 118 rises to a point close to the top of the baffle 124, the water pump 128 can be turned on (or its flow rate increased) to ensure that no water passes over the top of the baffle 124, i.e. to the downstream side of the baffle 124, functioning as a weir, which would contaminate the oil. A water by-pass conduit and valve assembly 129 is provided to handle very high levels of water production entering the separation tank 102.

Gas that is collected on the downstream side of the coalescer 123 can exit the separator tank 102 through the conduit 130 to be flared or collected, or it can be boosted using the compressor 131 and pumped into the main gas production line (not shown) from the platform. The gas pressure within the separator tank 102 is measured using pressure sensor 132 that can be connected to the controller. Additionally a pressure relief safety valve 133 is provide to ensure that the pressure within the separator tank can never rise above a predefined value.

Those skilled in the art will appreciate that sensors 107, 120, 121, 122, 125 and 132 can be connected to a controller or controllers, schematically illustrated by a single controller 203, which in turn can be programmed to control the flow into the inlet separator tank 101 through conduit 103, the valves that direct flow from the inlet separator tank 101 into the separation tank 102 via the hydrocyclone 108, the pumps/boosters 126, 128 and 131 that allow oil, water and gas to exit the separation tank 102 as different phase flow streams, and the valves to the by-pass exit conduits 127, 129 and 130 that allow these flows to exit the system 100 as required. The details of such a programmed controller 214 to operate and provide the functions described above are well known to those skilled in the art. In addition, the same (or other) controller(s) can monitor the weight of solids collected in bucket 109 and can control the solids flushing process as described earlier. Again such a process is well known to those skilled in the art.

In any embodiment a coarse particle separator 216 may be located upstream of the separation tank 102, as shown schematically in FIG. 1, or alternatively upstream of the inlet separator tank 101.

Using the apparatus and method of the preferred embodiment described herein, production from a well or group of wells that contains oil, water, gas and solids can be separated into streams of four phases using a separation system 100 forming a compact unit as shown in FIG. 1, which optionally can be mounted on a single skid or frame. Additionally this separation unit will recycle the produced gas to improve the efficiency of oil/water separation and remove the requirement for another process product, for example, nitrogen gas. Such a system reduces the platform space required and improves the overall efficiency of the four phase separation process, thus reducing the capital and operational costs to the oil & gas operator.

The present invention may be embodied in many different forms and should not be construed as being limited to the embodiments set forth herein; rather, these embodiments are provided so that this disclosure will be thorough and complete, and will fully convey the concept of the invention to those skilled in the art.

The invention claimed is:

1. An apparatus for separating oil, water, gas and solid particles from a hydrocarbon-containing fluid produced from an oil and/or gas production facility, the apparatus comprising a separation tank, the separation tank comprising:
    an inlet for a multiphase hydrocarbon-containing fluid comprising oil, water, gas and solid particles to be separated into its constituent oil, water, gas and solid phases, the inlet being at an upstream side of the separation tank;
    a solids separator in fluid communication with the inlet;
    a solid particles collector located beneath the solids separator such that the separated solid particles from the solids separator are collected in said solid particles collector;

a solids outlet connected to the separation tank such that solids separated by the solids separator from the multiphase hydrocarbon-containing fluid can be removed from the separation tank through said solids outlet;

a flushing unit located in the vicinity of the solid particles collector for flushing the collected solid particles from the solid particles collector and though the solids outlet;

a first reservoir for containing an oil/water liquid mixture, from the multiphase hydrocarbon-containing fluid, which has been separated from the solids separated by the solids separator;

an upper part of the separation tank being located above the first reservoir for receiving gas separated from the oil/water liquid mixture;

a second reservoir for containing oil separated from the oil/water liquid mixture, the second reservoir being located downstream of the first reservoir;

a weir at an end of the first reservoir that divides the first reservoir from the second reservoir, the weir being provided to separate oil from the oil/water liquid mixture;

a first liquid outlet of the first reservoir connected to a lower part of the separation tank;

a second liquid outlet of the second reservoir connected to the lower part of the separation tank; and a gas outlet connected to the upper part of the separation tank.

2. An apparatus according to claim 1 wherein the solids separator is a hydrocyclone.

3. An apparatus according to claim 1 further comprising a weighing device for weighing the separated solid particles in said solid particles collector.

4. An apparatus according to claim 3 further comprising a controller for the flushing unit, the controller being arranged to operate the flushing unit based on a solids weight detected by the weighing device.

5. An apparatus according to claim 1 further comprising a first measurement device for measuring a level of the water/oil liquid mixture in the first reservoir.

6. An apparatus according to claim 5 further comprising a second measurement device for measuring, directly or indirectly, a level of a water/oil interface in the water/oil liquid mixture in the first reservoir.

7. An apparatus according to claim 6 further comprising a third measurement device for measuring, directly or indirectly, a level, depth or volume of oil in the second reservoir.

8. An apparatus according to claim 1 wherein at least one of the first liquid outlet and/or the second liquid outlet further comprises a pump located downstream thereof for controlling a liquid flow rate through the respective outlet.

9. An apparatus according to claim 1 wherein the gas outlet further comprises a compressor.

10. An apparatus according to claim 1 wherein at least one of the gas outlet, the first liquid outlet and/or the second liquid outlet further comprises a respective bypass conduit and associated valve.

11. An apparatus according to claim 1 further comprising a pressure sensor for monitoring an internal gas pressure of the separation tank.

12. An apparatus according to claim 11 further comprising a safety pressure release valve connected to the upper part of the separation tank, the safety pressure release valve being configured to be opened when the internal gas pressure exceeds a predefined maximum safe operating limit.

13. An apparatus according to claim 1 further comprising a coarse solid particle separator upstream of the inlet for separating coarse particles from the hydrocarbon-containing fluid.

14. An apparatus according to claim 1 further comprising a gas fluffer positioned along a lower portion of the first reservoir.

15. An apparatus according to claim 14 wherein the separation tank further comprises a second inlet for gas connected to the gas fluffer, the second inlet being provided to supply gas to the gas fluffer.

16. An apparatus according to claim 15 further comprising a first separator provided upstream of the separation tank, the first separator comprising an inflow conduit for the hydrocarbon-containing fluid, a first outlet of the first separator communicating an upper part of the first separator with the second inlet to convey gas separated from the hydrocarbon-containing fluid to the gas fluffer provided inside the separation tank, and a second outlet communicating a lower part of the first separator with the inlet of the separation tank to convey liquid and solid phases of the hydrocarbon-containing fluid to the separation tank.

17. An apparatus according to claim 16 wherein the first separator further includes a liquid level sensor and a first control module coupled thereto for controlling a liquid level within the first separator to be within a predetermined range.

18. An apparatus according to claim 17 wherein the first separator further includes an internal gas pressure sensor and a second control module coupled thereto for controlling a gas pressure within the first separator to be within a predetermined range.

19. An apparatus according to claim 16 wherein the first separator further comprises a third outlet of the first separator, located lower on the first separator than the first outlet, communicating the upper part of the first separator with the inlet to convey gas separated from the hydrocarbon-containing fluid to the separation tank.

20. An apparatus according to claim 19 wherein the first outlet, the second outlet and the third outlet are each provided with a respective independently controllable valve selectively to open or close the respective outlet and control a flow rate through the respective outlet.

21. An apparatus according to claim 20 further comprising a controller comprising respective valve controlling modules for the respective valves.

22. An apparatus according to claim 1 further comprising a coalescer within the upper part of the separation tank and positioned above the first reservoir, the coalescer being adapted to remove oil and water droplets entrained in gas from the hydrocarbon-containing fluid the separated gas through condensation of oil and/or water onto a surface of the coalescer.

23. An apparatus according to claim 1 which is adapted continuously to separate oil, water, gas and solid particles from a continuous flow of a hydrocarbon-containing fluid produced from an oil and/or gas production facility.

24. An oil and/or gas production facility incorporating the apparatus of claim 1.

* * * * *